(12) United States Patent
Chen et al.

(10) Patent No.: US 9,084,242 B2
(45) Date of Patent: Jul. 14, 2015

(54) ON TRANSPARENCY OF COMP

(75) Inventors: Runhua Chen, Plano, TX (US); Eko N. Onggosanusi, Allen, TX (US); Anthony Ekpenyong, Houston, TX (US); Vikram Chandrasekhar, Mountain View, CA (US)

(73) Assignee: TEXAS INSTRUMENTS INCORPORATED, Dallas, TX (US)

( * ) Notice: Subject to any disclaimer, the term of this patent is extended or adjusted under 35 U.S.C. 154(b) by 0 days.

(21) Appl. No.: 13/586,274

(22) Filed: Aug. 15, 2012

(65) Prior Publication Data

US 2013/0215835 A1 Aug. 22, 2013

Related U.S. Application Data

(60) Provisional application No. 61/523,537, filed on Aug. 15, 2011, provisional application No. 61/525,320, filed on Aug. 19, 2011, provisional application No. 61/583,249, filed on Jan. 5, 2012.

(51) Int. Cl.
*H04W 72/04* (2009.01)
*H04L 5/00* (2006.01)
*H04B 7/02* (2006.01)

(52) U.S. Cl.
CPC ........... *H04W 72/0406* (2013.01); *H04B 7/024* (2013.01); *H04L 5/001* (2013.01); *H04L 5/0032* (2013.01)

(58) Field of Classification Search
CPC .......................... H04W 72/04; H04W 72/0406
USPC ........ 370/329, 312, 336, 252; 455/422.1, 450
See application file for complete search history.

(56) References Cited

U.S. PATENT DOCUMENTS

| | | | |
|---|---|---|---|
| 2011/0034175 A1* | 2/2011 | Fong et al. | 455/450 |
| 2011/0103287 A1* | 5/2011 | Ma et al. | 370/312 |
| 2013/0029657 A1* | 1/2013 | Gao et al. | 455/422.1 |
| 2013/0039199 A1* | 2/2013 | Liao et al. | 370/252 |
| 2013/0039349 A1* | 2/2013 | Ebrahimi Tazeh Mahalleh et al. | 370/336 |

* cited by examiner

*Primary Examiner* — Albert T Chou
(74) *Attorney, Agent, or Firm* — Ronald O. Neerings; Frank D. Cimino

(57) ABSTRACT

This invention is a technique for coordinate multi-point wireless transmission between plural base stations and user equipment. At least one base station transmits via a Physical Downlink Shared CHannel (PDSCH). The user equipment does not know the identity of the plural base stations. This could include joint transmission by simultaneous data transmission from multiple base stations. This could include dynamic point selection by data transmission from one base station at a time and changing the transmitting point (TP) from one subframe to another subframe. This could include coordinated scheduling/beamforming (CS/CB) where data is transmitted to the user equipment from one base station at a time and the base stations communicate to coordinate user scheduling and beamforming. The transmission point (TP) could vary over Resource Block (RB) pairs within a subframe while never transmitting from more than one base station. The transmission point (TP) could change in a semi-static fashion.

10 Claims, 4 Drawing Sheets

US 9,084,242 B2

ON TRANSPARENCY OF COMP

CLAIM OF PRIORITY

This application claims priority under 35 U.S.C. 119(e)(1) to U.S. Provisional Application No. 61/523,537 filed Aug. 15, 2011, U.S. Provisional Application No. 61/525,320 filed Aug. 19, 2011, U.S. Provisional Application No. 61/583,249 filed Jan. 5, 2012.

TECHNICAL FIELD OF THE INVENTION

The technical field of this invention is wireless communication such as wireless telephony.

BACKGROUND OF THE INVENTION

The present embodiments relate to wireless communication systems and, more particularly, to Coordinated Multi-Point (CoMP) transmission in which a single mobile unit communicates with plural base stations.

In legacy wireless cellular systems such as Long Term Evolution (LTE) Rel. 8 to 10, a wireless network includes multiple base stations. Each base station may be configured as a single cell with its own cell ID. Mobile terminals or user equipment (UE) always connect to and exchange uplink (UL) data and downlink (DL) data with a connected cell in single-cell transmission/reception.

CoMP stands for Coordinated Multi-Point Transmission. In CoMP multiple transmission points (TP) such as a cell, macro eNB, pico eNB, femto eNB, remote radio heads, distributed antennas, other wireless transmission entity or a combination of these coordinate with each other to jointly optimize downlink beam forming signals. These include beam forming vectors, transmission power and/or scheduling decisions. In contrast to traditional wireless networks without cell coordination where signals from other transmission points impose as co-channel interference, coordination within multiple TPs allows the signals to be cooperatively designed to reduce co-channel interference, boost received signal to noise ratio (SNR) and improve cell-average throughput and cell-edge coverage.

It is expected that CoMP in Rel. 11 is based on non-codebook-based beam forming with UE reference signals (UE-RS). UE-RS is equivalently referred to as demodulation reference signals (DMRS). This patent application proposes a transparent design of CoMP.

SUMMARY OF THE INVENTION

This invention is a technique for coordinated multi-point wireless transmission between a plurality of base stations and at least one user equipment. At least one base station transmits via a Physical Downlink Shared CHannel (PDSCH) to the user equipment. The user equipment receives these transmissions without knowing the identities of the plural base stations. This could include joint transmission by simultaneous data transmission from multiple base stations. This could also include dynamic point selection by data transmission from one base station at a time and changing the transmitting point (TP) from one subframe to another subframe. A third possible scheme is coordinated scheduling/beamforming (CS/CB) where data is transmitted to the user equipment from one base station at a time and the base stations communicate to coordinate user scheduling and beamforming. The transmission point (TP) could vary over resource block (RB) pairs within a subframe while never transmitting from more than one base station. The transmission point (TP) could change in a semi-static fashion.

This technique includes a first base station transmitting on a Physical Downlink Shared CHannel (PDSCH) a first cell ID and a second base station transmitting on a Physical Downlink Control CHannel (PDCCH) the first cell ID. The base stations could use the same scrambling sequence configured by higher layer signaling, different scrambling sequences dynamically signaled in a down link (DL) grant or different scrambling sequence sequences semi-statically signaled via a Radio Resource Control (RRC) higher layer signaling a first set of scrambling sequences and dynamically signaled via down link (DL) grant.

BRIEF DESCRIPTION OF THE DRAWINGS

These and other aspects of this invention are illustrated in the drawings, in which.

DETAILED DESCRIPTION OF PREFERRED EMBODIMENTS

Figure 1:
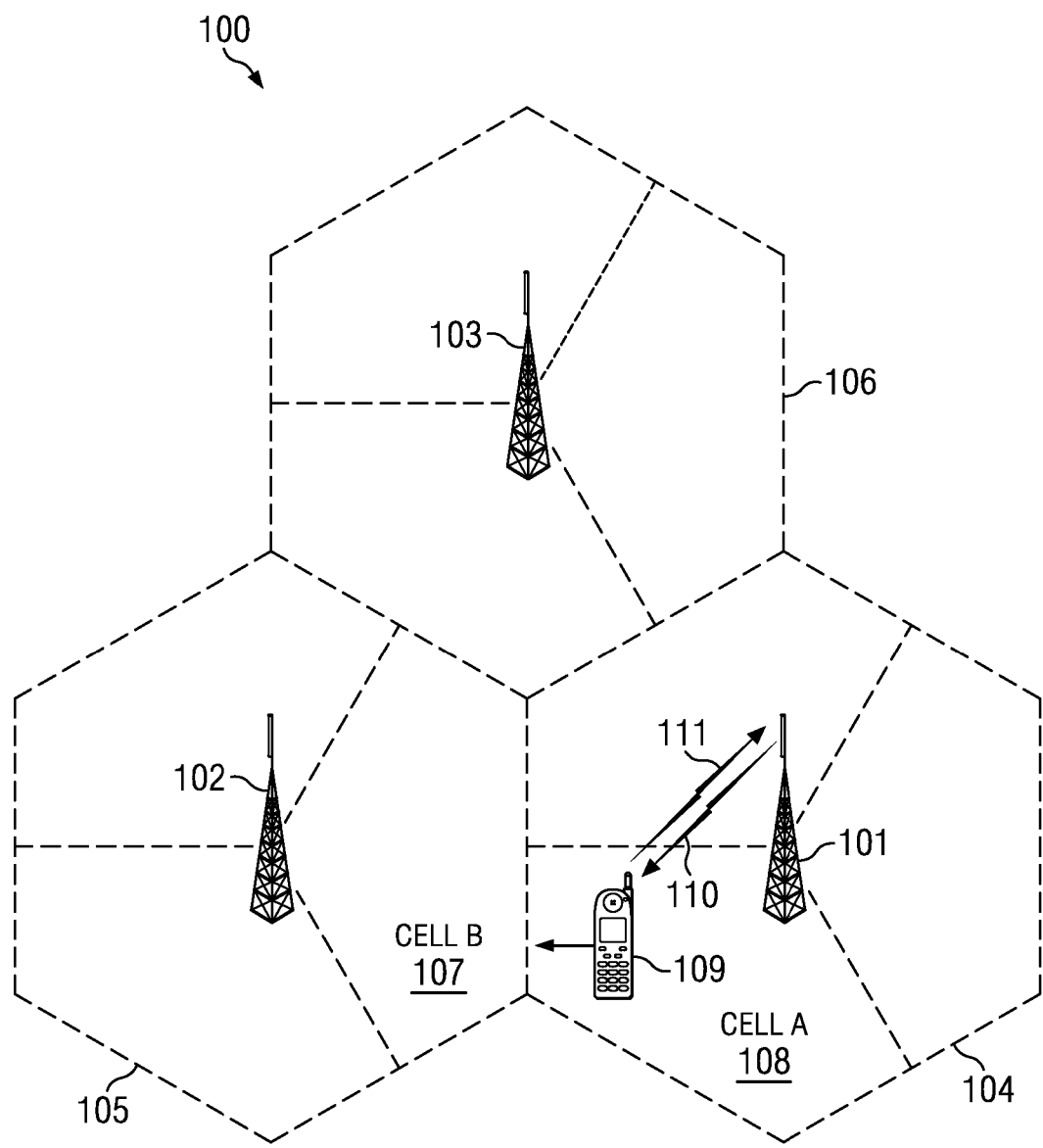
FIG. 1 illustrates an exemplary prior art wireless communication system to which this application is applicable.

FIG. 1 shows an exemplary wireless telecommunications network 100. The illustrative telecommunications network includes base stations 101, 102 and 103, though in operation, a telecommunications network necessarily includes many more base stations. Each of base stations 101, 102 and 103 (eNB) are operable over corresponding coverage areas 104, 105 and 106. Each base station's coverage area is further divided into cells. In the illustrated network, each base station's coverage area is divided into three cells. Handset or other user equipment (UE) 109 is shown in Cell A 108. Cell A 108 is within coverage area 104 of base station 101. Base station 101 transmits to and receives transmissions from UE 109. As UE 109 moves out of Cell A 108 and into Cell B 107, UE 109 may be handed over to base station 102. Because UE 109 is synchronized with base station 101, UE 109 can employ non-synchronized random access to initiate handover to base station 102.

Non-synchronized UE 109 also employs non-synchronous random access to request allocation of up-link 111 time or frequency or code resources. If UE 109 has data ready for transmission, which may be traffic data, measurements report, tracking area update, UE 109 can transmit a random access signal on up-link 111. The random access signal notifies base station 101 that UE 109 requires up-link resources to transmit the UEs data. Base station 101 responds by transmitting to UE 109 via down-link 110, a message containing the parameters of the resources allocated for UE 109 up-link transmission along with a possible timing error correction. After receiving the resource allocation and a possible timing advance message transmitted on down-link 110 by base station 101, UE 109 optionally adjusts its transmit timing and transmits the data on up-link 111 employing the allotted resources during the prescribed time interval.

Base station 101 configures UE 109 for periodic uplink sounding reference signal (SRS) transmission. Base station 101 estimates uplink channel quality information (CSI) from the SRS transmission.

Figure 2:
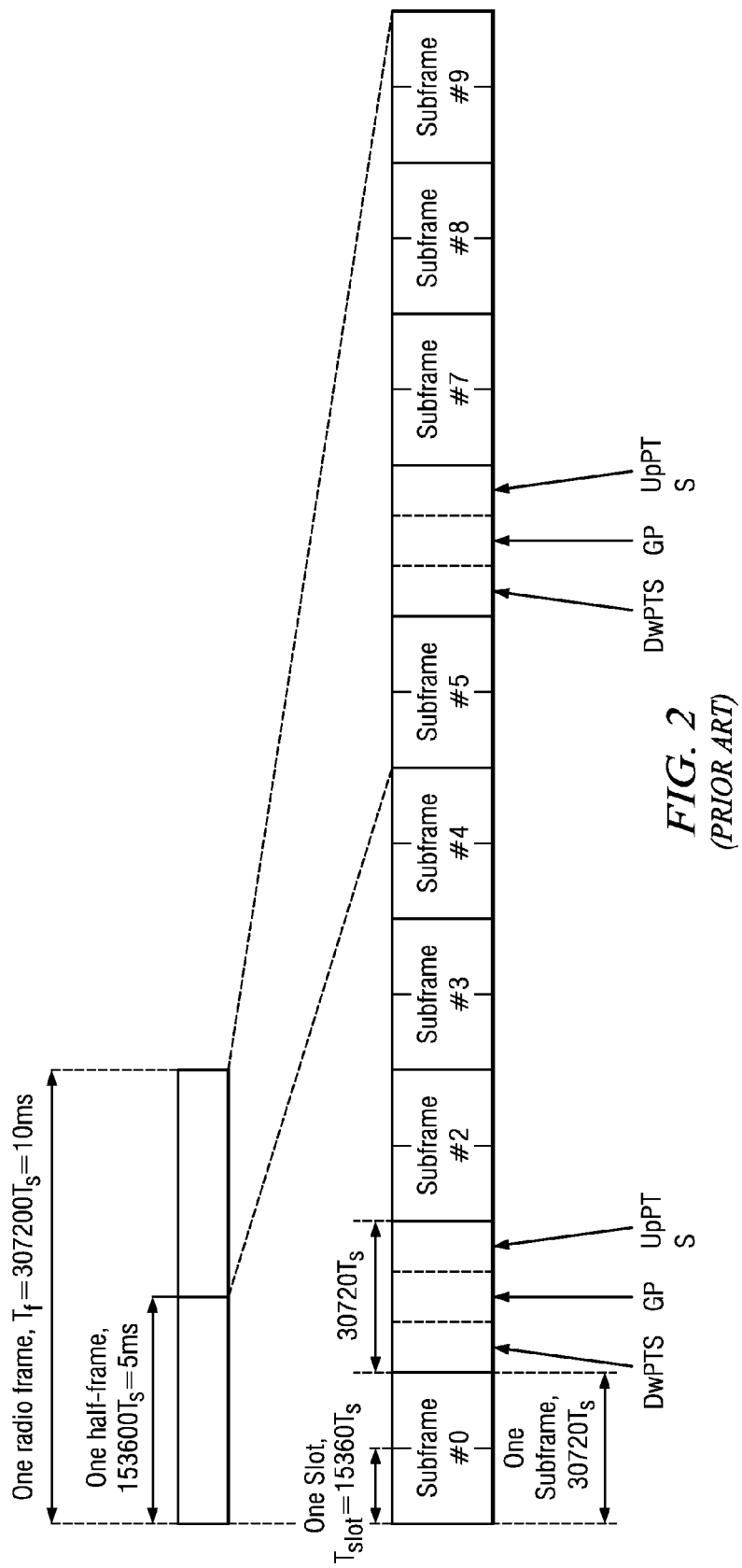
FIG. 2 shows the Evolved Universal Terrestrial Radio Access (E-UTRA) Time Division Duplex (TDD) frame structure of the prior art.

FIG. 2 shows the Evolved Universal Terrestrial Radio Access (E-UTRA) time division duplex (TDD) Frame Structure. Different subframes are allocated for downlink (DL) or uplink (UL) transmissions. Table 1 shows applicable DL/UL subframe allocations.

TABLE 1

| Configuration | Switch-point periodicity | Sub-frame number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 10 ms | D | S | U | U | U | D | S | U | U | D |

CoMP Transmission Schemes

A number of possible CoMP transmission schemes have been identified including but not limited to the following. In joint Processing (JP) data for a UE is available at more than one point in the CoMP cooperating set for a particular time-frequency resource. A CoMP cooperating set is a set of transmission points that coordinate with each other and transmit downlink data. Joint processing includes joint Transmission (JT) where simultaneous data transmission from multiple points to a single UE or multiple UEs in a time-frequency resource. Data directed to a UE is simultaneously transmitted from multiple points. This coherently or non-coherently improves the received signal quality, data throughput or actively cancels interference for other UEs. Joint processing also includes Dynamic Point Selection (DPS) where data is transmitted from one point at each time instance. The transmitting point may change from one subframe to another in a rapid and dynamic manner. Data is available simultaneously at multiple points.

In Coordinated Scheduling/Beam forming (CS/CB) data for a UE is only available at one point in the CoMP cooperating set and DL data transmission occurs from that point for a specific time resource such as a subframe. User scheduling/beam forming decisions are made with coordination among points in the CoMP cooperating set. The used point can be chosen dynamically or semi-statically. In Dynamic Point Selection (DPS) data is transmitted from one point at a time. The transmitting point may change from one subframe to another including varying over Resource Block (RB) pairs within a subframe but data is never transmitted simultaneously from multiple points. In Semi-Static Point Selection (SSPS) transmission to a specific UE occurs from one point at a time. The transmitting point may only change in a semi-static manner.

Figure 3:
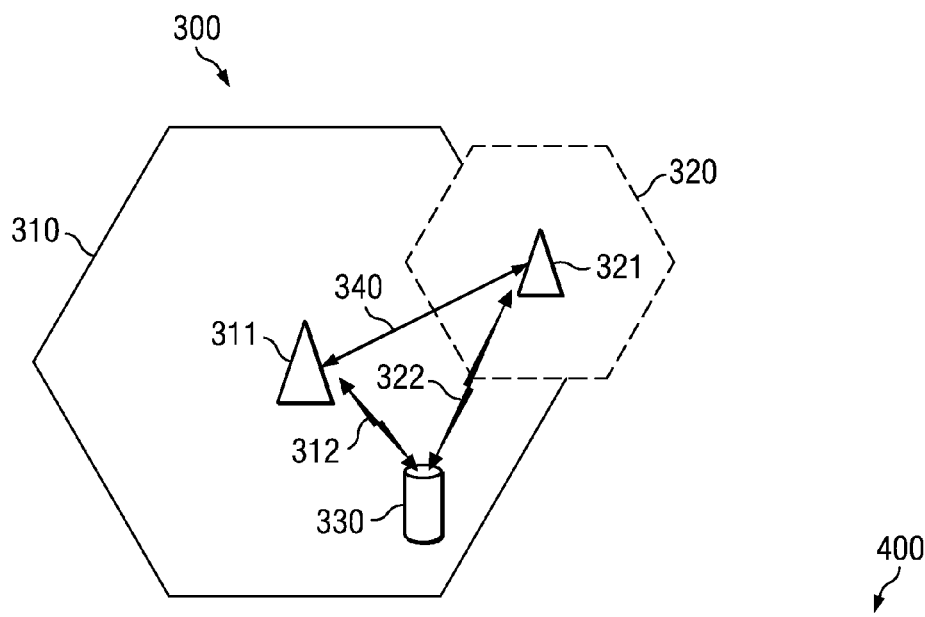
FIG. 3 illustrates an example Coordinated Multi-Point scenario.

FIG. 3 illustrates an example CoMP scenario 300. Cell 310 includes main base station (eNB) 311. Subsidiary cell 320 includes subsidiary base station (eNB) 321. User equipment (UE) 330 communicates with both base stations. Main eNB 311 communicates with UE 330 via two-way radio frequency link 312. Subsidiary eNB 321 communicates with UE 330 via two-way radio frequency link 322. FIG. 3 illustrates UE 330 within cell 310 and not within cell 320, but this is only an example. UE 330 may be located only 330 within cell 320 and not within cell 310 or within both cells 310 and 320. The two eNBs 311 and 321 must generally communicate via a backhaul network 340.

In conventional single-cell communication, all downlink signals transmitted from a cell are dependent on the cell ID. The pseudo-random sequence generator for the CSI-RS of each cell is initialized by a parameter $C_{init}$ which is a function of cell ID of the corresponding cell. The CSI-RS sequence is a function of the cell ID of the cell that the UE is synchronized to. Associating downlink signal to the cell ID randomizes intercell interference and is beneficial in single cell communication. For CoMP multi-cell communication, a UE needs to measure the downlink channel state information of multiple cells by measuring on multiple CSI-RS resources. Because the multiple base stations may correspond to different cells with different cell IDs, a mechanism is needed to inform the UE the CSI-RS sequence of the multiple CSI-RS resources so that CSI measurement can be performed. This cannot be achieved by conventional mechanism because UE only knows the cell ID of one strongest cell, but not all cells involved in CoMP coordinated.

Figure 4:
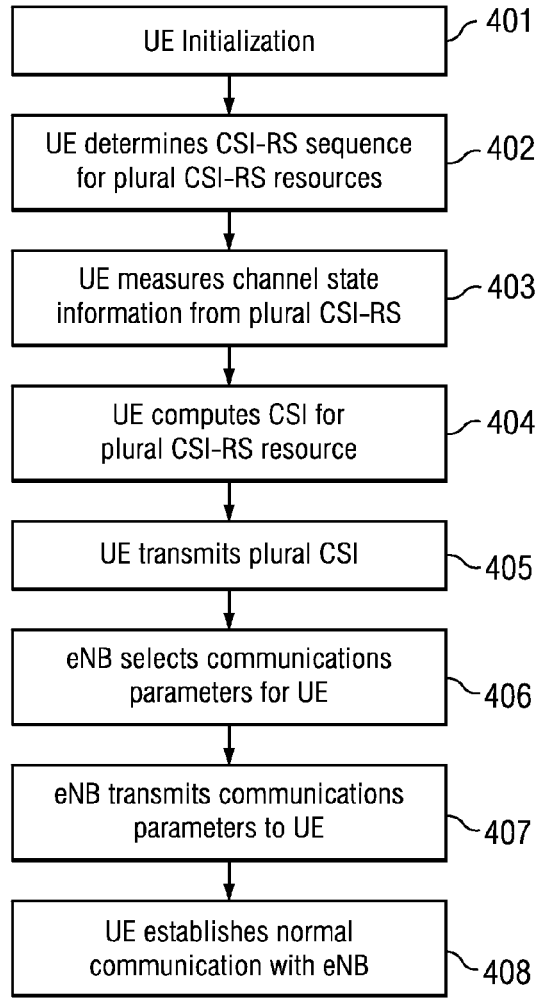
FIG. 4 illustrates the typical steps of initialization of a user equipment which includes this invention.

FIG. 4 illustrates the process 400 of the UE initiating communication. At block 401 the UE begins its initialization. This could occur by the UE powering up from an OFF state or the UE first coming within range of the corresponding eNB. The UE performs cell search, connects to one strongest cell and obtains its cell ID. In the known art the cell ID can be determined from primary synchronization signal (PSS) and secondary synchronization signal (SSS) of the strongest cell. These are continuously or periodically transmitted. The network subsequently configures the UE for CoMP communication where the UE not only communicates with the strongest cell but with another cell or cells. This requires the UE to measure the multiple CSI-RS resources of multiple cells. At this stage the UE does not know the CSI-RS sequence of other cells, because the UE does not know the cell IDs of the other cells involved in CoMP coordination. At block 402 the CSI-RS sequence for the CSI-RS resources of each cell in CoMP coordination is configured by higher-layer signaling to the UE. This higher-layer signaling could be transmitted to the UE by the strongest cell to which the UE is synchronized. Upon determination of the sequences for multiple CSI-RS resources, in block 403 the UE measures channel state information on the CSI-RS resource from each eNB. In a CoMP scenario there are plural such eNBs, each with its own CSI-RS resource. At least one of the communicating eNBs signals the UE which CSI-RS resources to measure. In block 404 the UE uses plural CSI-RS resources to compute a Channel State Information (CSI) for each of the plural eNBs. In block 405 the UE transmits these CSI measurements. The UE does not control which eNB receives this signal. The UE transmits this signal and one or more eNBs receive it.

In block 406 a eNB selects communication parameters for the UE to use in normal communications. These communications parameters may have the UE exchanging UL and DL signals with one or more of the plural eNBs. The eNB bases this selection on the plural CSI responses from the UE (block 405). In block 407 the communicating eNB(s) transmit information that the UE needs to cooperate with the set of eNBs. In block 408 the UE establishes normal communications in accordance with these communication parameters.

For CoMP the UE feedback (blocks 404 and 405) needs to contain multiple CSI measurements corresponding to multiple transmission points. In order to do this higher layer signaling configures multiple CSI-RS resources. Each CSI-RS resource corresponds to a unique single cell CSI-RS pattern. The linkage between each configured CSI-RS resource and each transmission point is configured at the eNB and can be transparent to the UE. The UE measures on the CSI-RS of each CSI-RS resource and reports the corresponding CSI. Thus the UE makes measurement on plural CSI-RS resources for this feedback operation.

The multiple transmission points involved in CoMP transmission can be configured as a single cell with one cell-ID or multiple cells with multiple cell-IDs. These are defined as single-cell ID CoMP and multi-cell-ID CoMP.

Transparency of CoMP Schemes

A CoMP transmission set is the set of transmission points that transmit data to a user at a particular time. The CoMP transmission set may change dynamically from one subframe to another. There are two possible configurations of a CoMP transmission set. In the first alternative the CoMP transmission set and transmission scheme is non-transparent to UE. The exact transmission set and CoMP scheme including JT, CB/CS or DPS is semi-statically configured via higher-layer signaling or dynamically signaled in the DL grant. In the second alternative the CoMP transmission set and transmission scheme is transparent to the UE. The DL grant or higher-layer signaling has no information regarding the exact CoMP transmission set and transmission scheme.

Comparing these two alternatives requires a close look at DMRS-based precoding. From a DL decoding perspective with DMRS DL beam forming becomes largely UE transparent where Physical Downlink Shared CHannel (PDSCH) decoding only needs to know the DMRS ports mapping for channel estimation. The exact transmission points or physical antennas and precoding matrix need not be similar to Rel. 10 Downlink Control Information (DCI) format 2C. From a DL control perspective the first alternative allows defining multiple CoMP transmission modes if configured semi-statically or defining multiple DL grant designs tailored toward each CoMP transmission scheme. The control signaling may also notify UE which point is being used for transmission. In the second alternative a single DCI format is sufficient because it allows dynamic switching between all CoMP schemes in a UE transparent manner. The first alternative provides flexibility at the expense of more standardization efforts. The second alternative is simpler.

It is not necessary for a UE to know the exact RRH(s) associated to its data transmission. CoMP beam forming occurs on eNB implementation and can be transparent to the UE. Rel. 10 control channel format designs may be re-used. The exact CoMP transmission scheme (JT, CB/CS, DPS) is usually an implementation choice made by the eNB depending on the system operation environment such as cell traffic loading, interference property, traffic scenarios, UE mobility, etc. It is possible for different UEs to be scheduled with different CoMP transmission schemes depending on their spatial distribution characteristics. For example, a TP may be transmitting with JT in one frequency resource to a first UE while transmitting with CB/CS in another frequency resource to a second UE. Switching between different CoMP schemes may occur dynamically on a per-subframe (1 ms) basis. Because DMRS provides transparent PDCSH decoding a UE does not need to know the exact CoMP scheme for its PDSCH. Dynamic switching between different CoMP transmission schemes is also possible due to the DMRS-based precoding. This is similar to dynamic SU/MU-MIMO switching in Rel. 10.

From a UE perspective, the exact CoMP scheme can be transparent (JT, CB/CS, DPS). This is similar to the transparency of single-user MIMO (SU-MIMO) and multi-user MIMO (MU-MIMO) in Rel. 10. Dynamic switching between various CoMP schemes is possible due to the support of DMRS. Dynamic fall-back to single-cell transmission is desirable.

This invention adopts a transparent CoMP design. Thus a UE is unaware of the exact CoMP transmission scheme (such as JT, CB/CS, DPS) used for CoMP transmission. For a given UE, its PDSCH data may be transmitted with different CoMP schemes on different time frequency resource including on different RBs in one subframe. The set of transmission points involved in CoMP transmission is transparent to a UE. The DL control signaling does not include any information regarding which set of transmission points are being used for serving a particular UE. The eNB may use different CoMP transmission schemes on different time-frequency resources. For example the eNB may transmit with JT in one set of RB and transmit with CB/CS in another set of RB in the same subframe. Dynamic switching between different CoMP schemes is supported on a subframe-by-subframe, and RB-by-RB basis. A single DCI format is used for multiple CoMP schemes (JT, CB/CS, DPS). The DCI contains no explicit information regarding the CoMP transmission scheme or the set of transmission points used for PDSCH transmission.

In certain scenarios PDSCH data and Physical Downlink Control CHannel (PDCCH) control message could be sent from different transmission points to a UE. For example a first TP or a first set of TPs transmits PDSCH and a second TP or a second set of TPs transmits PDCCH. In a single-cell ID CoMP scenario, all TPs are configured with the same cell ID and the UE is not able to differentiate different TPs because their PDSCH/PDCCH processing would be based on a single cell ID value. In this case CoMP and cross-point scheduling is completely transparent from a downlink perspective. In a multi-cell ID CoMP scenario the PDSCH-transmitting TP and PDCCH-transmitting TP are configured as different logical cells with different Cell ID. It is possible to send PDSCH data from one TP or cell with a first Cell ID and send PDCCH control from another TP or cell with a second Cell ID. This can be achieved transparently or non-transparently.

For non-transparent cross-point scheduling a first TP or Cell A transmits PDSCH with PDSCH processing such as scrambling, encoding, etc using a first Cell ID_A. The UE decodes PDSCH assuming Cell ID_A. For PDSCH, Cell ID_A is the cell ID of the serving cell (Cell ID) obtained by the UE upon synchronization. This Cell ID_A does not need to be explicitly signaled. A second TP or Cell B transmits PDCCH with PDCCH processing such as search space mapping, scrambling, etc. using a second Cell ID_B. The UE decodes PDCCH assuming Cell ID_B. For PDCCH, the higher layer signaling may semi-statically notify UE of the Cell ID_B value. UE uses Cell ID_B to monitor PDCCH in the corresponding search space. As an alternate PDCCH could be transmitted from multiple cells or TPs. The eNB must configure a set of Cell ID_B values for the UE to monitor PDCCH via higher layer signaling. This requires no change in DCI format.

For transparent cross-point scheduling (CP) a first TP or Cell A transmits PDSCH with PDSCH processing such as scrambling, beam forming, etc. using Cell ID_A. The UE decodes PDSCH assuming Cell ID_A. TP or Cell B transmits PDCCH on the radio air interface, but baseband processing of PDCCH such as scrambling, search space mapping is based on Cell ID_A. Though the radio signal of PDCCH is transmitted from TP or Cell B, the UE cannot tell that PDCCH is sent from TP or Cell_B. It appears to the UE as if the PDCCH is physically transmitted from TP or cell_A since PDCCH decoding only requires the cell ID value for search space mapping/scrambling. Thus UE processing of PDCCH decoding does not require any change from the legacy control procedure. Cross-point scheduling is done internally at the eNB baseband and is standard transparent from the perspective of the air interface. No change in DCI is required. Transparent cross-point scheduling is able to perform all functionalities of non-transparent cross-point scheduling without any specification impact. The transmission TP of cells of the PDCCH and the PDSCH could be exchanged in the examples above.

Transparency of CoMP Vs. Non-CoMP

The use of UE-RS makes it possible to make CoMP transmission transparent. Thus a UE is unaware whether a single-cell non-CoMP transmission or a multi-cell CoMP transmission is scheduled. The only parameter related to cell configuration that a UE needs to know for PDSCH reception is the PDSCH scrambling sequence and DMRS sequence. For JT, scrambling on each transmission point follows the scrambling sequence determined by the cell ID of the serving cell. For CB/CS, data is transmitted from a single cell/point. For dynamic cell/point selection, even though the transmission point used for PDSCH transmission may switch dynamically on a per-RB and per-subframe basis PDSCH scrambling always uses the scrambling sequence determined by the cell ID of the serving cell.

Thus it is possible for CoMP transmission to be completely transparent to the UE such that it is aware of CoMP or non-CoMP transmission. This flexibility is highly desirable in the downlink scheduling and would provide the optimum system performance than if CoMP and non-CoMP has to be used semi-statically. It would allow dynamic switching between CoMP and non-COMP transmission to a UE with seamless traffic support. A single downlink control format (PDCCH) could be used for both CoMP and non-CoMP, significantly reducing the amount of efforts for standardization.

This invention includes dynamic switching between single-cell non-CoMP and multi-cell CoMP transmission. A single DCI format supports both CoMP scheduling and non-CoMP scheduling. The DCI does not contain explicit information regarding the downlink transmission scheme (single-point or multi-point) or the set of transmission points used for data transmission. PDSCH scrambling, on one transmission point or on multiple transmission points, always uses the same scrambling sequence determined by a common cell ID. This is the cell ID of the serving cell which is the Rel. 8 to 10 procedure. This is necessary for coherent PDSCH decoding.

If enhanced PDCCH based on UE-RS precoding in PDSCH region is adopted in Rel. 11, it is possible to apply CoMP coordination on ePDCCH as well. In this case scrambling for an ePDCCH, transmitted on one TP or multiple TPs always uses the same scrambling sequence determined by a common cell ID (the cell ID of the serving cell).

There are three alternative for PDSCH scrambling sequence and DMRS scrambling. In the first alternative, the PDSCH scrambling sequence from one or of a set of TP/cells is configured by higher-layer Radio Resource Control (RRC) signaling. Thus the higher layer semi-statically configures one or a set of scrambling sequences or Cell ID to be used for PDSCH scrambling and DMRS sequence termination. In the second alternative the PDSCH scrambling sequence for transmission from one or of a set of TP/cells is dynamically signaled in the DL grant which triggers PDSCH transmission. The DL grant dynamically signals one or a set of scrambling sequences or Cell ID to be used for PDSCH scrambling or DMRS sequence generation. A third alternative uses a combination of RRC semi-static signal and dynamic signaling in DL grant configures the PDSCH scrambling sequence. Thus the RRC higher layer semi-statically configures a set of scrambling sequences or Cell ID to be used for scrambling of PDSCH/DMRS, while dynamic signaling in the DL grant (PDCCH) further chooses one or more scrambling sequences or Cell IDs within the set of semi-statically configured scrambling sequences or Cell IDs configured by RRC signaling to be used for PDSCH/DMRS scrambling.

For DMRS base sequence for PDSCH demodulation the above three alternatives can be used to determine the base sequences of DMRS to be transmitted from one or set of TP/Cells.

If enhanced PDCCH (ePDCCH) based on UE-RS precoding in PDSCH region is adopted in Rel. 11, it is possible to apply CoMP coordination on ePDCCH. Scrambling for an ePDCCH transmitted on one TP or multiple TPs always uses the same scrambling sequence determined by a common parameter such as the cell ID of the serving cell similar to the Rel. 8 to 10 procedure.

For ePDCCH scrambling there are three alternatives. In the first alternative scrambling of ePDCCH for transmission from one or a set of TP/cells, is RRC configured by higher-layer signaling. The higher layer semi-statically configures one or a set of scrambling sequences or Cell IDs to be used for ePDCCH scrambling. In the second alternative scrambling of ePDCCH for transmission from one or a set of TP/cells is dynamically signaled in a new DCI format which triggers ePDCCH transmission. The new DCI format dynamically signals one or a set of scrambling sequences or Cell ID to be used for ePDCCH scrambling. In the third alternative a combination of RRC semi-static signal and dynamic signaling configures the scrambling sequence of ePDCCH. The RRC higher layer semi-statically configures a set of scrambling sequences or Cell IDs to be used for scrambling of ePDCCH, while dynamic signaling in the new DCI format which triggers ePDCCH transmission chooses one or multiple scrambling sequences or Cell IDs within the set of semi-statically configured scrambling sequences or Cell ID configured by RRC signaling to be used for ePDCCH scrambling.

For DMRS base sequence for ePDCCH demodulation the above three alternatives can be used to determine the base sequences of DMRS to be transmitted from one or a set of TP/Cells.

In all cases, the base sequence or scrambling configuration of PDSCH could be identical or different to that of ePDCCH.

For a Rel. 10 DMRS sequence for antenna ports 7 to 14, the DMRS sequence r(m) is defined by:

$$r(m) = \frac{1}{\sqrt{2}}(1 - 2c(2m)) + j\frac{1}{\sqrt{2}}(1 - 2c(2m+1))$$

where: m is 0, 1, ... $12N_{RB}^{max,DL}-1$ for normal cyclic prefix and m is 0, 1, ... $16N_{RB}^{max,DL}-1$ for extended cyclic prefix; and the initialization seed $c_{init}$ is:

$$c_{init} = (\lfloor n_s/2 \rfloor + 1) \cdot (2N_{ID}^{cell} + 1) \cdot 2^{16} + n_{SCID}$$

The 1-bit scrambling ID $n_{SCID}$ can be 0 or 1 and is dynamically signaled in DCI formats 2B/2C for port 7 or 8. For port 9 to 14, $n_{SCID}$ is set to 0. The introduction of $n_{SCID}$ supports non-orthogonal MU pairing such as when spatial decoupling of two UEs is sufficiently good so that intra-cell interference can be effectively mitigated even without orthogonal DMRS.

In Rel. 10 the DMRS sequence is linked to the cell-ID. This mechanism is problematic for CoMP because the cell-ID configurations may be identical or different across different transmission points. This leads to the question whether cell-ID-based DMRS initialization is truly necessary. It should be noted that $N_{ID}^{cell}$ is really a nominal DMRS sequence initialization parameter whose value happened to be configured to be equivalent to the serving cell ID in Rel. 9 and 10 but in principle can take on reasonable value. A straightforward remedy to this problem replaces $N_{ID}^{cell}$ by a higher-layer configured initialization seed $N_{DMRS}^{seed}$ and re-uses the Rel. 10 DMRS sequence generator formula.

There are two alternatives for the exact $c_{init}$ value. IN the first alternative the higher layer configures one initialization seed $N_{DMRS}^{seed}$ and $n_{SCID}$ is interpreted as an offset to $N_{DMRS}^{seed}$. This is similar to Rel. 10. Thus DMRS initialization is dynamically chosen from the following two $c_{init}$ values:

$$c_{init}=(\lfloor n_s/2\rfloor+1)\cdot(2N_{DMRS}^{seed}+1)\cdot 2^{16}+0$$

$$c_{init}=(\lfloor n_s/2\rfloor+1)\cdot(2N_{DMRS}^{seed}+1)\cdot 2^{16}+1$$

In the second alternative the higher layer configures a set of seed initialization seeds $\{N_{DMRS,0}^{seed}, N_{DMRS,1}^{seed}\}$ and $n_{SCID}$ indicates which seed is chosen. Thus DMRS initialization can be dynamically selected from the following two $c_{init}$ values:

$$c_{init}=(\lfloor n_s/2\rfloor+1)\cdot(2N_{DMRS,0}^{seed}+1)\cdot 2^{16} \text{ if } n_{SCID}=0$$

$$c_{init}=(\lfloor n_s/2\rfloor+1)\cdot(2N_{DMRS,1}^{seed}+1)\cdot 2^{16} \text{ if } n_{SCID}=1$$

There are pros and cons with each alternative. The first selection has lower RRC signaling overhead but the available $c_{init}$ values are localized which limits the DMRS randomization flexibility. The second selection has better flexibility in configuring the DMRS randomness as arbitrary values of $\{N_{DMRS,0}^{seed}, N_{DMRS,1}^{seed}\}$ can be used. This comes at the expense of slightly higher RRC signaling overhead. This assumes that 1-bit $n_{SCID}$ is signaled in the DL grant. It is also possible that n-bit $n_{SCID}$ are signaled in order to increase the dimension of MU-MIMO multiplexing. In this case the same mechanism as in either selections can be used.

In yet another embodiment uses a hybrid approach to determine the DMRS initialization seed $c_{init}$. The higher layer configures a set of K initialization seeds $\{N_{DMRS,0}^{seed}, \ldots N_{DMRS,K-1}^{seed}\}$ and the exact $c_{init}$ is determined as:

$$c_{init}=(\lfloor n_s/2\rfloor+1)\cdot(2N_{DMRS}^{seed}+1)\cdot 2^{16}+g(n_{SCID})$$

where: $N_{DRMS}^{seed}=f(n_{SCID}, N_{DMRS,0}^{seed}, \ldots N_{DMRS,K-1}^{seed})$ and is chosen from the set of higher-layer configured seeds $\{N_{DMRS,0}^{seed}, \ldots N_{DMRS,K-1}^{seed}\}$; and of $g(n_{SCID})$ is an offset value.

As an example, assume that a 2-bit $n_{SCID}$ is signaled in the DL grant and that K=2 DMRS seeds $\{N_{DMRS,0}^{seed}, \ldots N_{DMRS,K-1}^{seed}\}$ are semi-statically configured by the higher layer. The dynamic $c_{init}$ seed can be calculated as:

$$c_{init}=(\lfloor n_s/2\rfloor+1)\cdot(2N_{DMRS,\lfloor n_{SCID}/2\rfloor}^{seed}+1)\cdot 2^{16}+\mathrm{mod}(n_{SCID},2)$$

where: $\lfloor \cdot \rfloor$ is the floor operation; and mod(·) indicates the modulo function. More specifically:

$$c_{init}=(\lfloor n_s/2\rfloor+1)\cdot(2N_{DMRS,0}^{seed})\cdot 2^{16} \text{ if } n_{SCID}=0$$

$$c_{init}=(\lfloor n_s/2\rfloor+1)\cdot(2N_{DMRS,0}^{seed})\cdot 2^{16}+1 \text{ if } n_{SCID}=1$$

$$c_{init}=(\lfloor n_s/2\rfloor+1)\cdot(2N_{DMRS,1}^{seed})\cdot 2^{16} \text{ if } n_{SCID}=2$$

$$c_{init}=(\lfloor n_s/2\rfloor+1)\cdot(2N_{DMRS,1}^{seed})\cdot 2^{16}+1 \text{ if } n_{SCID}=4$$

In this invention the Rel. 10 DMRS sequence generator formula is re-used by replacing $N_{ID}^{cell}$ with a higher-layer configured DMRS initialization seed value. There are two possible ways to calculate the exact $c_{init}$ values. In the first alternative the higher layer configures one initialization seed $N_{DMRS}^{seed}$ and $n_{SCID}$ is interpreted as offset value to the seed, similar to Rel. 10. In the second alternative the higher layer configures a set of initialization seeds $\{N_{DMRS,0}^{seed}, N_{DMRS,1}^{seed}\}$ and $n_{SCID}$ indicates which seed is selected.

Figure 5:
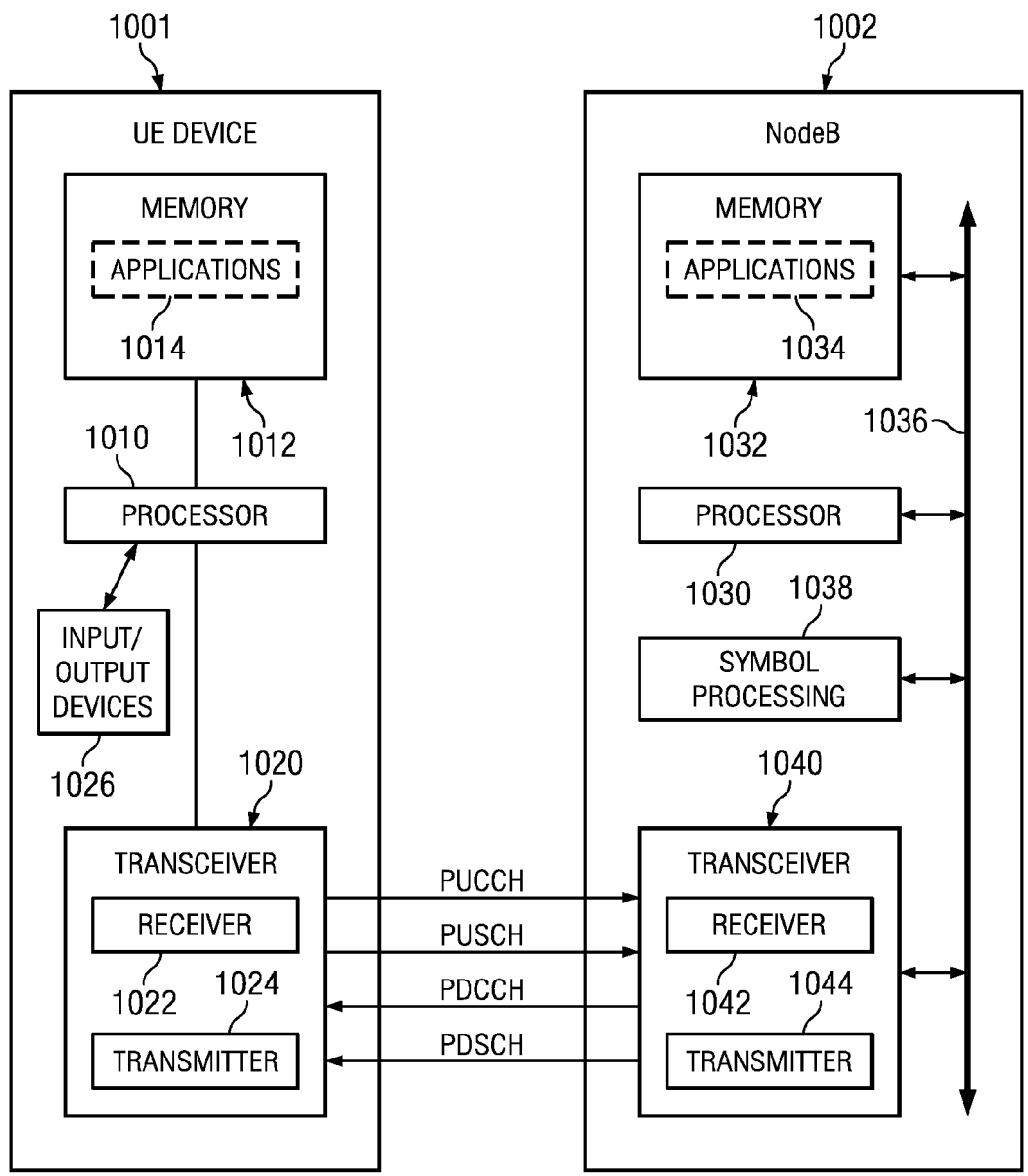
FIG. 5 is a block diagram illustrating internal details of a base station and a mobile user equipment in the network system of FIG. 1 suitable for implementing this invention.

FIG. 5 is a block diagram illustrating internal details of an eNB 1002 and a mobile UE 1001 in the network system of FIG. 1. Mobile UE 1001 may represent any of a variety of devices such as a server, a desktop computer, a laptop computer, a cellular phone, a Personal Digital Assistant (PDA), a smart phone or other electronic devices. In some embodiments, the electronic mobile UE 1001 communicates with eNB 1002 based on a LTE or Evolved Universal Terrestrial Radio Access Network (E-UTRAN) protocol. Alternatively, another communication protocol now known or later developed can be used.

Mobile UE 1001 comprises a processor 1010 coupled to a memory 1012 and a transceiver 1020. The memory 1012 stores (software) applications 1014 for execution by the processor 1010. The applications could comprise any known or future application useful for individuals or organizations. These applications could be categorized as operating systems (OS), device drivers, databases, multimedia tools, presentation tools, Internet browsers, emailers, Voice-Over-Internet Protocol (VoIP) tools, file browsers, firewalls, instant messaging, finance tools, games, word processors or other categories. Regardless of the exact nature of the applications, at least some of the applications may direct the mobile UE 1001 to transmit UL signals to eNB (base-station) 1002 periodically or continuously via the transceiver 1020. In at least some embodiments, the mobile UE 1001 identifies a Quality of Service (QoS) requirement when requesting an uplink resource from eNB 1002. In some cases, the QoS requirement may be implicitly derived by eNB 1002 from the type of traffic supported by the mobile UE 1001. As an example, VoIP and gaming applications often involve low-latency uplink (UL) transmissions while High Throughput (HTP)/Hypertext Transmission Protocol (HTTP) traffic can involve high-latency uplink transmissions.

Transceiver 1020 includes uplink logic which may be implemented by execution of instructions that control the operation of the transceiver. Some of these instructions may be stored in memory 1012 and executed when needed by processor 1010. As would be understood by one of skill in the art, the components of the uplink logic may involve the physical (PHY) layer and/or the Media Access Control (MAC) layer of the transceiver 1020. Transceiver 1020 includes one or more receivers 1022 and one or more transmitters 1024.

Processor 1010 may send or receive data to various input/output devices 1026. A subscriber identity module (SIM) card stores and retrieves information used for making calls via the cellular system. A Bluetooth baseband unit may be provided for wireless connection to a microphone and headset for sending and receiving voice data. Processor 1010 may send information to a display unit for interaction with a user of mobile UE 1001 during a call process. The display may also display pictures received from the network, from a local camera, or from other sources such as a Universal Serial Bus (USB) connector. Processor 1010 may also send a video stream to the display that is received from various sources such as the cellular network via RF transceiver 1020 or the camera.

During transmission and reception of voice data or other application data, transmitter 1024 may be or become non-synchronized with its serving eNB. In this case, it sends a random access signal. As part of this procedure, it determines a preferred size for the next data transmission, referred to as a message, by using a power threshold value provided by the serving eNB, as described in more detail above. In this embodiment, the message preferred size determination is embodied by executing instructions stored in memory 1012 by processor 1010. In other embodiments, the message size determination may be embodied by a separate processor/memory unit, by a hardwired state machine, or by other types of control logic, for example.

eNB 1002 comprises a Processor 1030 coupled to a memory 1032, symbol processing circuitry 1038, and a transceiver 1040 via backplane bus 1036. The memory stores applications 1034 for execution by processor 1030. The applications could comprise any known or future application useful for managing wireless communications. At least some of the applications 1034 may direct eNB 1002 to manage transmissions to or from mobile UE 1001.

Transceiver 1040 comprises an uplink Resource Manager, which enables eNB 1002 to selectively allocate uplink Physical Uplink Shared CHannel (PUSCH) resources to mobile UE 1001. As would be understood by one of skill in the art, the components of the uplink resource manager may involve the physical (PHY) layer and/or the Media Access Control (MAC) layer of the transceiver 1040. Transceiver 1040 includes at least one receiver 1042 for receiving transmissions from various UEs within range of eNB 1002 and at least one transmitter 1044 for transmitting data and control information to the various UEs within range of eNB 1002.

The uplink resource manager executes instructions that control the operation of transceiver 1040. Some of these instructions may be located in memory 1032 and executed when needed on processor 1030. The resource manager controls the transmission resources allocated to each UE 1001 served by eNB 1002 and broadcasts control information via the PDCCH.

Symbol processing circuitry 1038 performs demodulation using known techniques. Random access signals are demodulated in symbol processing circuitry 1038.

During transmission and reception of voice data or other application data, receiver 1042 may receive a random access signal from a UE 1001. The random access signal is encoded to request a message size that is preferred by UE 1001. UE 1001 determines the preferred message size by using a message threshold provided by eNB 1002. In this embodiment, the message threshold calculation is embodied by executing instructions stored in memory 1032 by processor 1030. In other embodiments, the threshold calculation may be embodied by a separate processor/memory unit, by a hardwired state machine, or by other types of control logic, for example. Alternatively, in some networks the message threshold is a fixed value that may be stored in memory 1032, for example. In response to receiving the message size request, eNB 1002 schedules an appropriate set of resources and notifies UE 1001 with a resource grant.

What is claimed is:

1. A method of coordinate multi-point (CoMP) wireless transmission between a plurality of base stations and at least on user equipment comprising the steps of:
   transmitting a first demodulation reference signal (DMRS) from one of the plurality of base stations;
   transmitting a data message to the user equipment by at least one of the plurality of base stations;
   receiving, through use of said first DMRS, the data message transmissions at the user equipment without the user equipment knowing the identity of the plural base stations, wherein:
   the step of the one of the plurality of base stations transmitting the first demodulation reference signal (DMRS) includes
   a higher-layer Radio Resource Control (RRC) signaling semi-statically a first set of DMRS sequences, and
   dynamic signaling in a downlink grant a dynamic selection of one DMRS sequence out of the first set of configured DMRS sequences; and
   said first DMRS employed for receiving the data message uses said dynamically selected DMRS sequence.

2. A method of coordinate multi-point (CoMP) wireless transmission between a plurality of base stations and at least on user equipment comprising the steps of:
   transmitting a data message to the user equipment by at least one of the plurality of base stations;
   receiving the data message transmissions at the user equipment without the user equipment knowing the identity of the plural base stations, wherein:
   said step of transmitting the data message further includes
   a first base station transmitting the data message to the user equipment using a first cell ID,
   a second base station transmitting a control message to the user equipment, and
   the control message from the second base station including a scheduling assignment for the data message from the first base station.

3. The method of claim 2, wherein:
   said step of the first base station transmitting the data message to the user equipment employs a first demodulation reference signal (DMRS) sequence; and
   said step of the second base station transmitting the control message employs a second demodulation reference signal (DMRS) sequence.

4. The method of claim 2, wherein:
   said step of the first base station transmitting the data message to the user equipment includes
   semi-statically configuring a first set of demodulation reference signal (DMRS) sequences by higher layer signaling,
   selecting a first demodulation reference signal (DMRS) sequence from the first set of demodulation reference signal (DMRS) sequences by a downlink (DL) grant; and
   said step of the second base station transmitting the control message to the user equipment includes
   semi-statically configuring a second set of demodulation reference signal (DMRS) sequences by higher layer signaling,
   selecting a second demodulation reference signal (DMRS) sequence from the second set of demodulation reference signal (DMRS) sequences by a downlink (DL) grant.

5. The method of claim 2, wherein:
   said step of the first base station transmitting on a Physical Downlink Shared CHannel (PDSCH) to the user equipment employs a first scrambling sequence, the first base station semi-statically signaling via a Radio Resource Control (RRC) higher layer signaling a first set of scrambling sequences and dynamically signaling via down link (DL) grant one scrambling sequence out of the first set of scrambling sequences; and
   said step of the second base station transmitting on a Physical Downlink Control CHannel (PDCCH) to the user equipment employs a second scrambling sequence, the second base station semi-statically signaling via a Radio Resource Control (RRC) higher layer signaling a second set of scrambling sequences and dynamically signaling via down link (DL) grant one scrambling sequence out of the second set of scrambling sequences.

6. A base station for wireless communication cooperatively with at least one other base station and at least one user equipment comprising:
- a transceiver operable to communicate with at least one user equipment by respectively transmitting radio frequency signals to the at least one user equipment and receiving radio frequency signals from the at least one user equipment;
- a programmable digital data processor connected to said transceiver; and
- a memory connected to said digital data processor storing data and at least one application program controlling operation of said programmable digital data processor, said at least one application program operable to control said programmable digital data processor to transmit a first demodulation reference signal (DMRS) and a data message to the user equipment by at least one of the plurality of base stations without revealing the identity of the plural base stations, wherein:
- said at least one application program stored in said memory is further operable to transmit the first demodulation reference signal (DMRS) by
  - a higher-layer Radio Resource Control (RRC) signaling semi-statically a first set of DMRS sequences, and
  - dynamic signaling in a downlink grant a dynamic selection of one DMRS sequence out of the first set of configured DMRS sequences.

7. The base station of claim 6, wherein:
- said at least one application program stored in said memory is further operable to transmit the data message by
  - a first base station transmitting the data message to the user equipment using a first cell ID,
  - a second base station transmitting a control message to the user equipment, and
  - the control message from the second base station includes a scheduling assignment for the data message from the first base station.

8. The base station of claim 7, wherein:
- said at least one application program stored in said memory is further operable to
- transmit the data message to the user equipment employing a first demodulation reference signal (DMRS) sequence, and
- transmit the control message to the user equipment employing a second demodulation reference signal (DMRS) sequence.

9. A base station for wireless communication cooperatively with at least one other base station and at least one user equipment comprising:
- a transceiver operable to communicate with at least one user equipment by respectively transmitting radio frequency signals to the at least one user equipment and receiving radio frequency signals from the at least one user equipment;
- a programmable digital data processor connected to said transceiver; and
- a memory connected to said digital data processor storing data and at least one application program controlling operation of said programmable digital data processor, said at least one application program operable to control said programmable digital data processor to transmitting a data message to the user equipment by at least one of the plurality of base stations without revealing the identity of the plural base stations, wherein:
- said at least one application program stored in said memory is further operable to
- transmit the data message to the user equipment including
  - semi-statically configuring a first set of demodulation reference signal (DMRS) sequences by higher layer signaling,
  - selecting a first demodulation reference signal (DMRS) sequence from the first set of demodulation reference signal (DMRS) sequences by a downlink (DL) grant; and
- transmit the control message to the user equipment including
  - semi-statically configuring a second set of demodulation reference signal (DMRS) sequences by higher layer signaling,
  - selecting a second demodulation reference signal (DMRS) sequence from the second set of demodulation reference signal (DMRS) sequences by a downlink (DL) grant.

10. A base station for wireless communication cooperatively with at least one other base station and at least one user equipment comprising:
- a transceiver operable to communicate with at least one user equipment by respectively transmitting radio frequency signals to the at least one user equipment and receiving radio frequency signals from the at least one user equipment;
- a programmable digital data processor connected to said transceiver; and
- a memory connected to said digital data processor storing data and at least one application program controlling operation of said programmable digital data processor, said at least one application program operable to control said programmable digital data processor to transmitting a data message to the user equipment by at least one of the plurality of base stations without revealing the identity of the plural base stations, wherein:
- said at least one application program stored in said memory is further operable to
- transmit on a Physical Downlink Shared CHannel (PDSCH) to the user equipment employing a first scrambling sequence, a first base station semi-statically signaling via a Radio Resource Control (RRC) higher layer signaling a first set of scrambling sequences and dynamically signaling via down link (DL) grant one scrambling sequence out of the first set of scrambling sequences, and
- transmit on a Physical Downlink Control CHannel (PDCCH) to the user equipment employing a second scrambling sequence, a second base station semi-statically signaling via a Radio Resource Control (RRC) higher layer signaling a second set of scrambling sequences and dynamically signaling via down link (DL) grant one scrambling sequence out of the second set of scrambling sequences.

* * * * *